US006257364B1

United States Patent
Parkhill et al.

(10) Patent No.: US 6,257,364 B1
(45) Date of Patent: Jul. 10, 2001

(54) SUBMERSIBLE ELECTRO-HYDRAULIC POWERPACK FOR UNDERHOOD AUTOMOTIVE STEERING APPLICATIONS

(75) Inventors: Scott Thomas Parkhill, Pettysburg, OH (US); David Carnell Reuter, Saline; Sunil Palakodati, Westland, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/488,734

(22) Filed: Jan. 20, 2000

(51) Int. Cl.⁷ ....................................................... B62D 5/06
(52) U.S. Cl. ........................ 180/417; 180/422; 180/429
(58) Field of Search ........................ 180/417, 422, 180/421, 423, 429; 74/388 PS; 417/410.1, 422

(56) References Cited

U.S. PATENT DOCUMENTS

| 2,291,346 | 7/1942 | Robinson . |
|---|---|---|
| 2,732,802 | 1/1956 | Eames, Jr. . |
| 2,762,311 | 9/1956 | Litzenberg . |
| 2,928,961 | 3/1960 | Morrill . |
| 3,137,234 | 6/1964 | Mosbacher . |
| 3,790,309 | 2/1974 | Volz . |
| 3,936,238 | 2/1976 | Wycliffe . |
| 4,002,029 | 1/1977 | Jones . |
| 4,286,442 | 9/1981 | Peterson . |
| 4,452,592 | 6/1984 | Tsai . |
| 4,500,270 | 2/1985 | Tuckey . |
| 4,540,354 | 9/1985 | Tuckey . |
| 4,718,514 | 1/1988 | Hirakushi . |
| 4,754,829 | 7/1988 | Shimizu . |
| 4,819,170 | 4/1989 | Shimizu . |
| 4,856,608 | 8/1989 | Adams . |
| 4,865,145 | 9/1989 | Ijiri . |
| 4,978,282 | 12/1990 | Fu . |
| 5,006,048 | 4/1991 | Jow . |
| 5,133,423 | 7/1992 | Ijiri . |
| 5,145,021 | 9/1992 | Nakamura . |
| 5,230,396 | 7/1993 | Yasui . |
| 5,355,315 | 10/1994 | Daido . |
| 5,392,690 | * 2/1995 | Hundertmark ..................... 91/417 R |
| 5,573,079 | 11/1996 | Suda . |
| 5,622,479 | 4/1997 | Earle . |
| 5,785,013 | 7/1998 | Sinn . |
| 5,810,111 | * 9/1998 | Takeuchi et al. .................... 180/443 |
| 5,995,890 | * 11/1999 | Permuy ................................ 701/42 |
| 5,998,005 | * 11/1999 | Onodera et al. ................ 74/388 PS |
| 6,030,187 | * 2/2000 | Whitefield et al. .................. 417/366 |
| 6,092,618 | * 7/2000 | Collier-Hallman .................. 180/422 |

FOREIGN PATENT DOCUMENTS

| 4303328 | 8/1994 | (DE) . |
|---|---|---|
| 1539393 | 1/1990 | (SU) . |

OTHER PUBLICATIONS

Machine Design Magazine—"New Techniques Muffle Hydraulic Noise" by Stanley J. Skaistis, vol. 51, No. 7, Mar. 22, 1979, pp. 120–126.

* cited by examiner

Primary Examiner—Paul N. Dickson
Assistant Examiner—Avraham H. Lerner
(74) Attorney, Agent, or Firm—Gregory P. Brown

(57) ABSTRACT

An electro-hydraulic power steering system having a motor, a pump, and a control module all formed as an integral unit. The motor is shaft coupled to the pump and the pump housing and the motor housing are sealingly attached to prevent any fluid leakage. The control module is sealingly attached to the pump housing to prevent any fluid leakage. The control module is in electrical communication with the motor in order to drive a motor shaft and operate the hydraulic pump. The entire unit is submersible and can operate when submersed.

20 Claims, 3 Drawing Sheets

SUBMERSIBLE ELECTRO-HYDRAULIC POWERPACK FOR UNDERHOOD AUTOMOTIVE STEERING APPLICATIONS

TECHNICAL FIELD

The present invention relates generally to electro-hydraulic power packs for use in automotive applications. More specifically, the present invention relates to a submersible electro-hydraulic power pack for use in automotive power steering applications.

BACKGROUND ART

The use of hydraulic pumps, such as power steering pumps, is well known in the automotive industry. The use of an electro-hydraulic power steering system having an individual hydraulic pump shaft-coupled to a separate electric motor has also become well known in the automotive industry. These power steering systems typically have a combined electronic control unit and power module functionally connected to the motor such as through a wiring harness or the like. In current systems, the control unit and module are often mounted remotely from the motor and pump and often at some considerable distance away.

Such a motor, pump, module arrangement is relatively costly to manufacture and assemble because each of the components is separate and discrete requiring that they be manufactured and sold individually. Further, because they are separate units that are typically mounted at least some distance from one another, they require the usage of a large space envelope underneath the hood of a vehicle. Additionally, the more parts required to operate the system, the heavier and the more expensive the system becomes.

Further, these prior systems are all configured such that they are shielded from direct splash, such as through the inclusion of a splash guard. This is to prevent the components from being damaged due to a direct splash of water from underneath the vehicle. However, if the undercarriage of a vehicle into which a typical power steering system (pump, motor, and module) is installed, were to become submerged in water or other fluid, it would typically leak and most likely damage one or more components of the system rendering them inoperable for at least a short period of time. This is because current power steering systems are not designed to be submersible when operating. For example, typical electrical connections between the module and the motor have rubber seals which are insufficient to prevent water from leaking into the pump/motor housing. Additionally, typical pump/motor modules have drain holes to allow water to drain out in the event any finds its way into the housing. Those drain holes would allow water direct access to the interior of the pump/motor module in the event the module was submerged.

SUMMARY OF THE INVENTION

It is therefore an object of the present invention to provide an electro-hydraulic power steering system having all necessary components assembled as an integrated unit that is submersible when operating without any resultant water damage.

It is a further object of the present invention to provide an integrated electro-hydraulic power steering system having all necessary components assembled as an integrated unit allowing for the components of the system to share functions, resulting in the usage of less parts and therefore a cost and weight savings.

It is another object of the present invention to provide an integrated electro-hydraulic power steering system having a shaft bearing retention that allows for easy non-destructive removal of the shaft and bearing for service.

In accordance with the objects of the present invention, an electro-hydraulic power steering system is provided. The system includes a power pack having an electric motor with a rotatable drive shaft and a hydraulic pump having a gear drive in rotatable communication with the drive shaft. The electric motor is disposed in a motor housing having a closed end and an open end. The open end of the motor housing is in communication with the motor drive shaft such that the drive shaft can extend therethrough. The open end of the motor housing is secured to one end of a pump housing. The other end of the pump housing is secured to a pump reservoir. The pump reservoir is in fluid communication with the pump in order to provide fluid thereto such that the pump can pass the fluid to a steering gear as required.

An electronic control module which controls the operation of the motor is disposed on the pump housing and in thermal communication with the pump reservoir such that the power pack and the electronic control module are constructed as a single modular unit. The modular unit is constructed such that it can be submerged in liquid while operating without leakage, which would affect the operation.

Other objects and features of the present invention will become apparent when viewed in light of the detailed description of the preferred embodiment when taken in conjunction with the attached drawings and independent claims.

DETAILED DESCRIPTION OF THE PREFERRED EMBODIMENT

Figure 1:
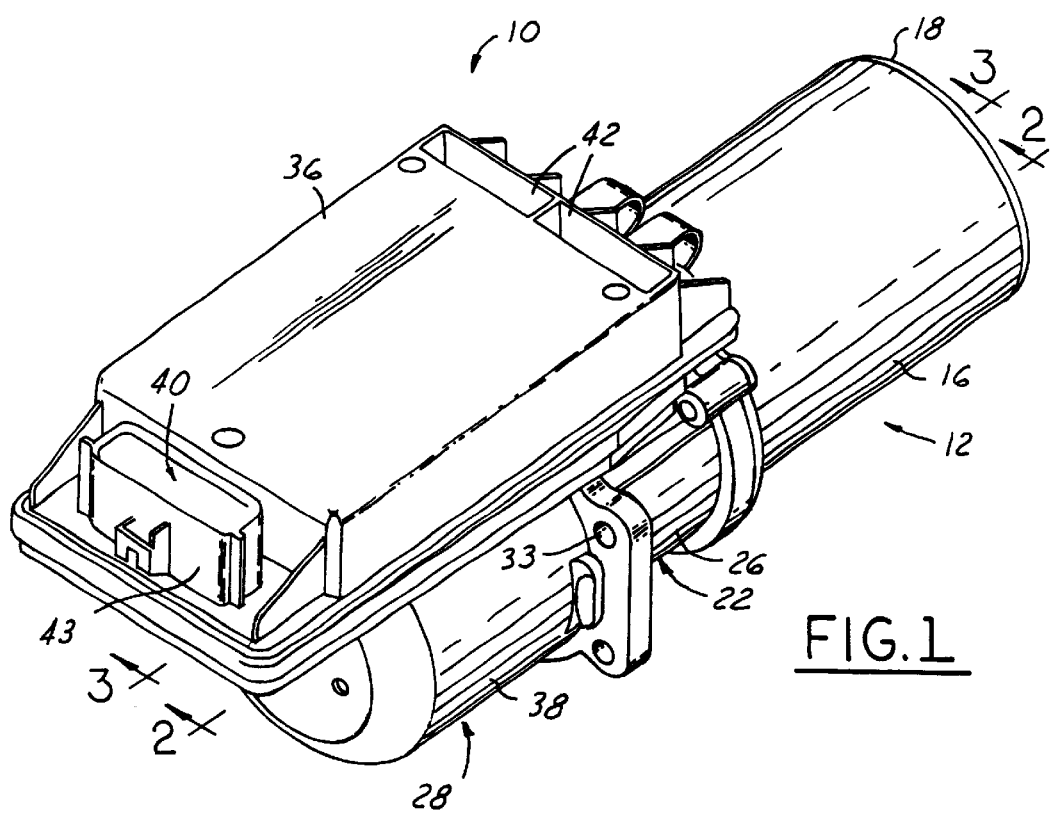
FIG. 1 is a perspective view of an electro-hydraulic power steering system in accordance with a preferred embodiment of the present invention.
Figure 2:
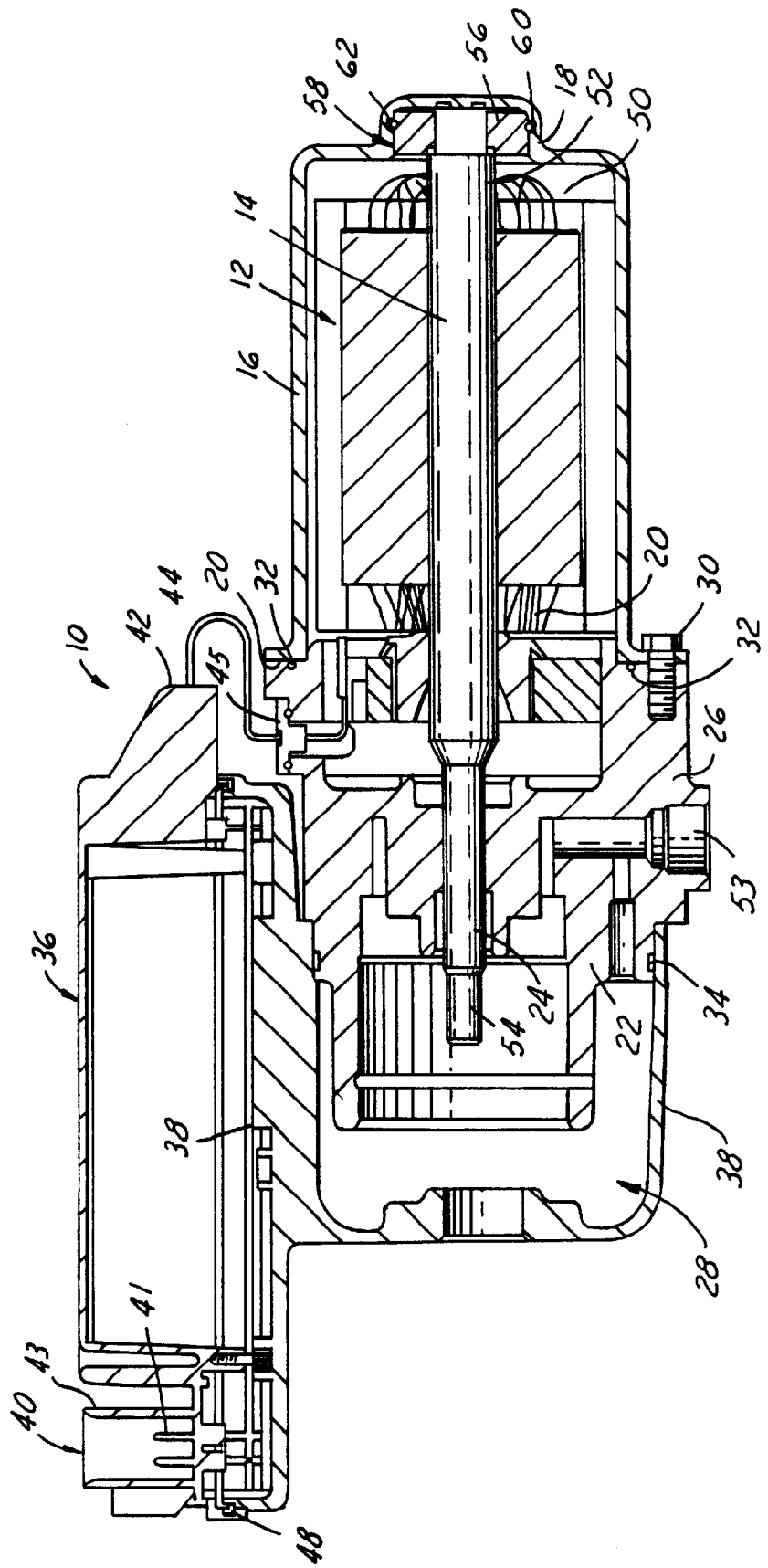
FIG. 2 is a cross-sectional view of an electro-hydraulic power steering system as viewed from one side in accordance with a preferred embodiment of the present invention.
Figure 3:
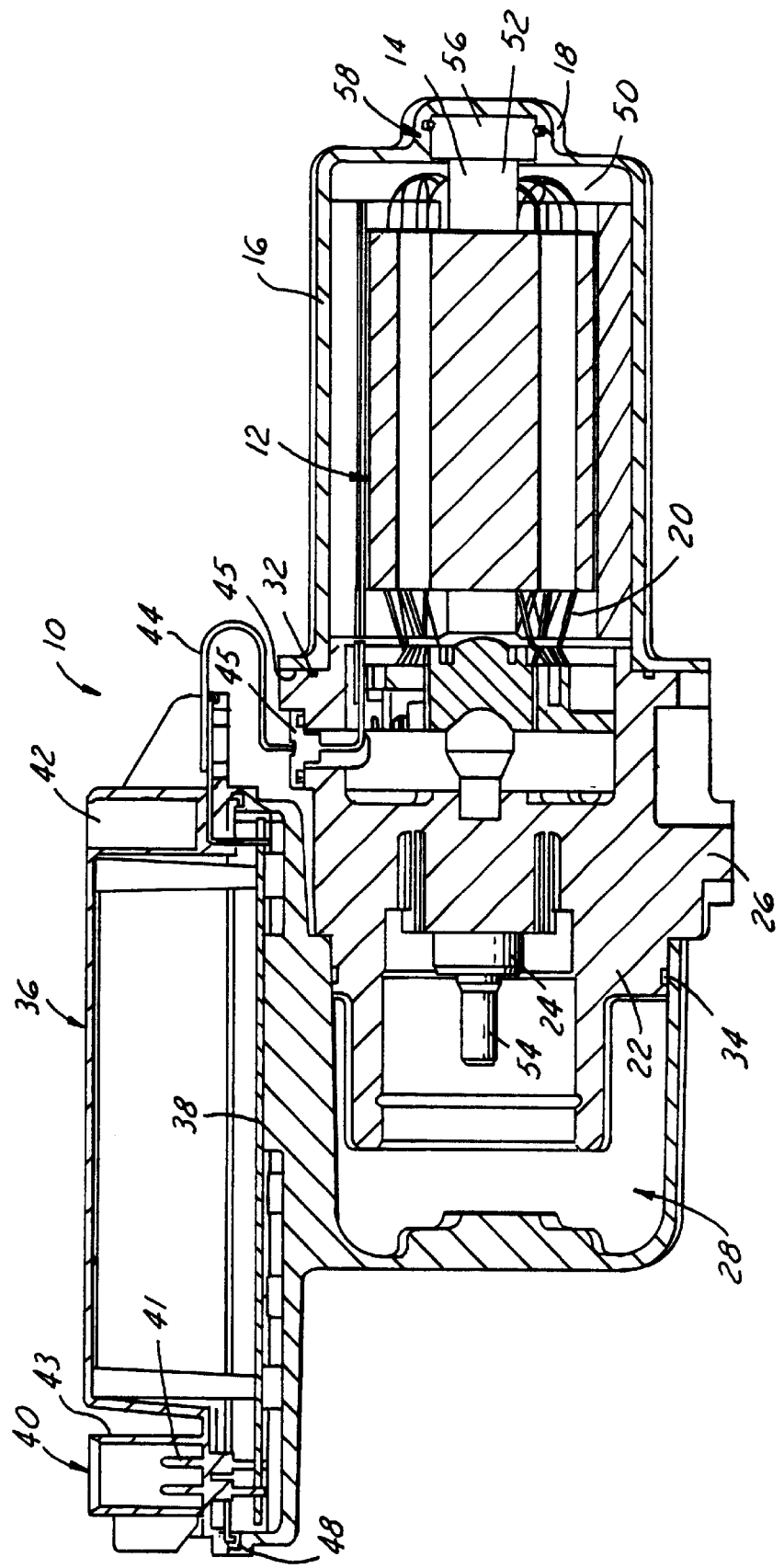
FIG. 3 is a cross-sectional view of an electro-hydraulic power steering system as viewed from another side from the other side of the system.

Referring now to FIGS. 1 through 3, which illustrate an electro-hydraulic power steering system 10, in accordance with the present invention. The system 10 includes a motor 12 having a rotatable drive shaft 14. The motor 12 is disposed in a motor housing 16 having a closed end 18 and an open end 20. The rotatable drive shaft 14 of the motor 12 preferably extends through the open end 20 of the motor housing 16. The disclosed motor 12 may be any commercially available DC motor or any other asynchronous device.

The system 10 also includes a hydraulic pump or gear pump 22 having a drive gear 24 which is in rotational communication with the drive shaft 14. The hydraulic pump 22 is preferably disposed within a pump housing 26. The pump housing 26 is preferably in communication at one end with the motor housing 16 and at the other end with a pump reservoir 28. Alternatively, the pump 20 may be disposed entirely within the pump reservoir 28. The hydraulic pump 22 is preferably a positive displacement pump, such as a gear pump or a vane pump, however any other dispositive displacement pump may be utilized. The pump housing 26 is preferably secured to the motor housing 16 by fasteners 30 such as conventional screws, bolts or the like. A seal 32 such as an o-ring or the like is preferably disposed at the junction between the pump housing 26 and the motor housing 16 to prevent egress of fluid from outside the housings and into contact with the components contained therein.

The pump reservoir 28 is preferably secured to the pump housing 26 by fasteners 33 or other conventional securing mechanism. A pump reservoir seal 34 is preferably disposed at the junction between the pump housing 26 and the pump reservoir 28 to prevent egress of fluid into or out of the pump reservoir 28 from outside the pump housing 26 or reservoir 28.

An electronic control unit 36, preferably including a power module, is disposed on an outer surface 38 of the reservoir housing 38. The electronic control unit 36 includes an input electrical interconnect 40 to provide power to the control unit 36. The input electrical interconnect 40 includes a plurality of connection terminals 41 that are disposed within a housing 43, preferably made of plastic or the like. When a male portion (not shown) engages the terminals 41, a seal is formed to prevent the terminals 41 from being contacted by fluid. At the opposing end of a control unit 36, is an output electrical interconnect 42. The output electrical interconnect 42 is in communication with the input electrical interconnect 40 for control purposes. The power to drive the motor is provided to the electrical output interconnect 42 from a specific electrical connector (not shown). The output electrical interconnect 42 is in communication with the motor 12 via a sealed motor/module connector 44 that passes through a sealed motor connector 45 that allows current to be transferred to the motor without providing any leak paths.

The electronic control unit 36 is preferably secured to an outer surface 46 of the pump reservoir 28. Alternatively, the electronic control unit 36 can be integrally formed such as by casting with the outer surface 46 of the pump reservoir 28. The junction where the electronic control unit 36 is secured to the pump reservoir 26 has a modular seal 48 located thereat preventing any leakage of fluid therethrough. The electronic control module 36 is disposed over the pump reservoir 28 such that the electronic control module 36 is in thermal communication with the pump reservoir 28 such that the pump reservoir acts as a heat sink to absorb any excess heat generated by the electronic control unit 36 during use and protect the components thereof.

The electronic control unit 36 is in electrical communication with a plurality of windings 50 which are part of the motor 12 through the motor module power connector which includes the terminals 44 and the plug 45 The plug 45 also acts to seal the interior of the motor housing from the outside. Current is applied from electronic control module 36 to the windings 50 to cause the drive shaft 14 to rotate. The drive shaft 14 has a first end 52 in proximity to the closed end 18 of the motor housing 16 and a second end 54 which extends into communication with the drive gear 24 of the hydraulic pump 22. As the drive shaft 14 rotates, it draws fluid from the fluid reservoir 28 into the pump and out an exit passageway 53 to a steering gear (not shown), as is known in the art.

Figure 4:
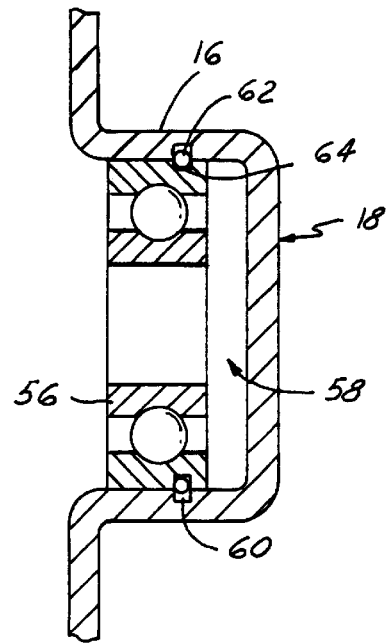
FIG. 4 is an enlarged illustration of a bearing snap ring arrangement for a motor housing for communicating with a motor drive shaft in accordance with a preferred embodiment of the present invention.

As shown specifically in FIG. 4, the first end 52 of the drive shaft 14 is in communication with a bearing 56. The bearing 56 is located in an annular recess 58 or bearing bore formed in the closed end 18 of the motor housing 16. The annular recess 58 has an annular groove 60 formed therein for receipt of a snap ring 62. The snap ring 62 is retained within the annular groove 60 formed in the annular recess 58 of the motor housing 16. The snap ring 62 has an inner diameter that is slightly smaller than the outer diameter of the bearing 56. For example, in the preferred embodiment, the inner diameter of the snap ring 62, may be only one millimeter smaller than the outer diameter of the bearing 56. As the bearing 56 is slid or pressed into the annular recess 58, the radius at the intersection of the bearing face outer diameter and the snap ring 62 presses against the rounded side of the snap ring 62. This produces a wedging action and opens the inner diameter of the snap ring 62. The snap ring 62 is caused to expand into the annular groove 60 of the annular recess 58 and allows the outer diameter of the bearing 56 to pass therethrough. When the bearing snap ring groove 64 reaches the inner diameter of the snap ring 62, the inner diameter of the snap ring 62 reduces to the new diameter of the bearing groove 64. The bearing groove 64 preferably has a square corner to maintain the snap ring 62 therein.

When the square corner of the bearing snap ring groove 64 contacts the round cross-section snap ring 62, the wedging forces to expand the snap ring inner diameter versus the rounded radius of the bearing face are tremendously higher. Because of this, the bearing 56 becomes locked into place until a considerably larger axial load is applied to the bearing 56. Thus, in accordance with the present invention, when a large enough load is applied too the bearing 56, it can be removed from the snap ring 62 for service. Therefore, in accordance with the present invention, the bearing 56 can be retained in a blind hole that locks into place without a second operation of applying snap rings. Additionally, the snap ring 62 cannot be installed after the bearing 56 is in place. The snap ring 62 must be installed before the bearing 56 is installed. The disclosed invention thus allows for the non-destructive removal of the bearing 56 and connected drive shaft 14 for service.

The axial retention forces are determined by the shape of the cross-sectional area of the snap ring 62 and/or size of the circular cross-section to the width and depth of the groove 64 in the bearing 56. Alternatively, a lighter axial retention force can be obtained by utilizing a groove having the same configuration, but by utilizing a larger circular cross-section snap ring 62. Further, a larger axial retention force can be obtained by utilizing a smaller diameter snap ring 62. In accordance with another embodiment, the radius of the snap ring cross-section and the depth of the bearing groove 64 are the same and are both one-half of the groove width, then the bearing 56 will be permanently locked into place. Also, a square or rectangular cross-sectional snap ring 62 can be used, resulting in a design that would be a one-time permanent assembly requiring a destructive method of disassembly.

It should be understood that other cross-sectional shapes could be used for the snap ring 62 such as a curve or angle on one side and a square on the other would allow for easy removal and with permanent retention and no ability for disassembly. Alternatively, the annular groove 60 for the snap ring 62 to expand could also be located on the outer diameter of the shaft in or the inner diameter of the bearing 56. With this configuration, the snap ring 62 would then compress to a smaller diameter, but the same concept as described above would apply.

Having now fully described the invention, it will be apparent to one of ordinary skill in the art that many changes and modifications can be made thereto without departing from the spirit or scope of the invention as set forth herein.

What is claimed is:

1. An electro-hydraulic power steering system comprising:
    a power pack including:
    an electric motor having a rotatable drive shaft;
    a pump having a gear drive in rotatable communication with said drive shaft;
    a motor housing encompassing said electric motor, said motor housing having a closed end and an open end, with said drive shaft adjacent said open end;
    a pump housing secured to said motor housing and having a pump reservoir formed therein, said pump being in fluid communication with said pump reservoir; and
    an electronic control module for controlling the operation of said motor, said electronic control being in thermal communication with said pump reservoir;
    wherein said power pack and said electronic control module are constructed so that they can be jointly submersed in liquid while operating.

2. The system of claim 1, wherein said electronic control module is integrally formed with said pump housing.

3. The system of claim 1, wherein said electronic control module is cast into said pump housing.

4. The system of claim 1, wherein said closed end of said motor housing has an annular recess formed therein.

5. The system of claim 4, wherein a bearing is positioned in said annular recess, said bearing having an outer surface and an inner surface, said inner surface being in communication with said drive shaft.

6. The system of claim 5, wherein said bearing has an annular groove formed in said outer surface.

7. The system of claim 6, wherein an annular groove is formed in an inner surface of said annular recess, corresponding to said bearing annular groove.

8. The system of claim 7, wherein a snap ring is partially located in both said bearing annular groove and said annular recess annular groove to retain said bearing in place.

9. The system of claim 8, wherein said snap ring has an inner diameter that is less than an outer diameter of said bearing.

10. An electro-hydraulic power steering system for a motor vehicle, comprising:
    an electric motor having a rotatable drive shaft, said drive shaft having a first end and a second end;
    a hydraulic pump in rotatable communication with said drive shaft;
    a motor housing in which said electric motor is disposed, said motor housing having an open end and a closed end;
    a pump housing, having a pump reservoir formed therein sealingly secured to said motor housing to prevent unwanted fluid from communicating with said electric motor or said hydraulic pump; and
    an electronic control module, having an input electrical interconnect and an output electrical interconnect, said electronic control module sealingly attached to said pump housing;
    said output electrical interconnect providing current to said motor through a sealed motor/module connector.

11. The system of claim 10 wherein said electronic control module is integrally formed with said pump housing.

12. The system of claim 10, wherein said sealed motor connector further comprises an encased electrical connector for providing current from said electronic control module to said motor and a module plug sealingly disposed in said pump housing so as to allow said electrical connector into said housing, but preventing fluid from flowing therethrough.

13. The system of claim 12, wherein said closed end of said motor housing has an annular recess formed therein, and a bearing positioned in said annular recess, said bearing having an outer surface and an inner surface, said inner surface being in communication with said second end of said drive shaft.

14. The system of claim 13, wherein said bearing is retained in said annular recess through the use of a snap ring.

15. The system of claim 14, wherein said outer surface of said bearing has an annular groove formed therein and an inner surface of said annular recess has an annular groove formed therein, said snap ring being partially disposed in both said bearing annular groove and said annular recess annular groove.

16. The system of claim 15, wherein said snap ring has an inner diameter that is smaller than an outer diameter of said bearing.

17. The system of claim 15, wherein said bearing annular groove is generally square in cross-sectional shape.

18. The system of claim 15, wherein said snap ring is generally square in cross-sectional shape.

19. The system of claim 15, wherein said bearing groove is formed on said inner surface of said bearing.

20. The system of claim 15, wherein said snap ring has a cross-section with a square side and an angled side.

* * * * *